United States Patent [19]

Eguchi et al.

[11] Patent Number: 4,687,822
[45] Date of Patent: Aug. 18, 1987

[54] ACRYLIC RESIN COMPOSITION FOR USE IN HIGH SOLIDS PAINTS

[75] Inventors: Yoshio Eguchi, Osaka; Atsushi Yamada, Kyoto, both of Japan

[73] Assignee: Nippon Paint Company, Ltd., Osaka, Japan

[21] Appl. No.: 813,551

[22] Filed: Dec. 26, 1985

[30] Foreign Application Priority Data

Dec. 26, 1984 [JP] Japan ................... 59-276707

[51] Int. Cl.$^4$ .............................. C08F 8/08
[52] U.S. Cl. ........................ 526/265; 526/304; 526/318.42; 526/318.45; 526/319; 526/329.2; 526/329.3; 526/347.1; 526/320
[58] Field of Search ............ 526/304, 265, 318.42, 526/318.45, 319, 329.2, 329.3, 347.1, 326

[56] References Cited

U.S. PATENT DOCUMENTS

| 2,714,621 | 8/1955 | Hogsed | 526/347.1 |
| 3,042,664 | 7/1962 | Price | 526/347.1 |
| 3,470,126 | 9/1969 | Sekmakas | 526/318.45 |
| 3,914,196 | 10/1975 | Loeffler | 526/318.45 |
| 4,165,418 | 8/1979 | Speakman | 526/329.2 |

*Primary Examiner*—Joseph L. Schofer
*Assistant Examiner*—Peter D. Mulcahy
*Attorney, Agent, or Firm*—Wenderoth, Lind & Ponack

[57] ABSTRACT

An acrylic resin composition for use in high solids paints which consists essentially of an acrylic copolymer having a number average molecular weight of 500 to 5000 and being prepared by subjecting a mixture of 30 to 88 weight % of an alkyl (meth)acrylate, 2 to 60 weight % of 2,4-diphenyl-4-methyl-1-pentene, 10 to 40 weight % of a hydroxy bearing ethylenically unsaturated monomer, 0 to 10 weight % of an ethylenic unsaturated acid and 0 to 30 weight % of other copolymerizable monomer(s) to a polymerization with one or more radical initiators. Such high solids paint containing such copolymers can produce coatings with excellent weather resistance, water resistance, scratch resistance and good appearance.

2 Claims, No Drawings

ACRYLIC RESIN COMPOSITION FOR USE IN HIGH SOLIDS PAINTS

In the paint industry, various attempts have been made to decrease the solvent ratio in a coating composition thereby increasing the solid contents which remain on the substrate as a coating. Particular attention has been directed, inter alia, to high solids containing coating compositions. In order to obtain such high solids paint, it is essential to use a resin with a lower molecular weight. However, in the preparation of such resins, there are many problems still awaiting satisfactory solutions.

That is, a low molecular weight resin may be prepared by using an increased amount of a chain transfer agent, such as mercaptans, but the thus obtained resin can only give a coating with an inferior water resistance and an insufficient weather resistance.

Alternatively, such a resin may be prepared by using a higher concentration of a polymerization initiator or by adopting a higher reaction temperature. However, in those cases, there are problems such that the employable reaction solvents are limited and further a particular reactor is required therefor. Thus, a fully satisfactory method for the preparation of a lower molecular weight resin has not yet been found.

There has also been known a technique wherein 2,4-diphenyl-4-methyl-1-pentene is used as a chain transfer agent in the preparation of homo- or copolymer of vinyl ester with a low polymerization degree, as stated in, for example, Japanese Patent Application Kokai No. (unexamined publication No.) 118489/78. Since this type of chain transfer agent does not include any mercapto groups, it is able to obviate the drawbacks inherent in the methods of using a conventional mercaptan chain transfer agent.

The abovesaid technique, however, concerns a polymerization of monomers composed mainly of vinyl esters and even if other copolymerizable monomers, such as acrylic acid and the like, coexist within the system, the weight ratio of such monomers are preferably limited to a lower level of less than 20 mole %.

Moreover, according to the above techniques, the amount of 2,4-diphenyl-4-methyl-1-pentene is only limited to a very low level of 0.001 to 1 weight % of the total monomers used. It is also stated that with the increase in the amount of chain transfer agent over the said range, there is a trend, such that vinyl ester polymerization speed decreases and the polymerization degree is extremely lowered.

The present inventors, having endeavored to obtain an acrylic resin having a lower molecular weight, e.g., a number average molecular weight 500 to 5000, which may be useful as a resinous vehicle in a high solids content paint, and have found that an ideal acrylic resin composition for the intended object can be obtained by using a particular and substantive amount of 2,4-diphenyl-4-methyl-1-pentene for the polymerization of monomers comprising alkyl(meth)acrylate and hydroxy bearing ethylenically unsaturated compounds, and on the basis of said finding, have come to the present invention.

According to the invention, there is provided an acrylic resin composition for use in a high solids paints consisting essentially of the acrylic resin having a number average molecular weight of 500 to 5000 and being prepared by subjecting a mixture of (A) alkyl(meth)acrylate: 30 to 88 weight %
(B) 2,4-diphenyl-4-methyl-1-pentene: 2 to 60 weight %
(C) hydroxy bearing ethylenically unsaturated monomer: 10 to 40 weight %
(D) ethylenic unsaturated acid: 0 to 10 weight %
(E) other copolymerizable monomer(s): 0 to 30 weight % to a polymerization with one or more radical initiators.

Examples of alkyl(meth)acrylates which constitute the main monomer component of the above acrylic resin are $C_1$ to $C_{12}$ alkyl esters of (meth)acrylic acid, including methyl methacrylate, ethyl methacrylate, n-butyl methacrylate, isobutyl methacrylate, methyl acrylate, ethyl acrylate, butyl acrylate, isobutyl acrylate, 2-ethylhexyl acrylate, lauryl methacrylate, 2-ethylhexyl methacrylate and the like. Such monomer(s) is (are) used in an amount corresponding to 30 to 88 weight % of the total weight of monomers and chain transfer agent. As the second monomer, one or more hydroxy bearing ethylenically unsaturated monomers are used in an amount corresponding to 10 to 40 weight % of the total weight of monomers and chain transfer agent. Examples of such monomers are hydroxyethyl acrylate, hydroxyethyl methacrylate, hydroxypropyl acrylate, hydroxypropyl methacrylate, diethylene glycol acrylate, diethylene glycol methacrylate, hydroxybutyl acrylate, hydroxybutyl methacrylate, and the members represented by either one of the following formulae:

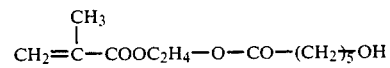

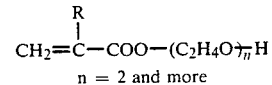

n = 2 and more

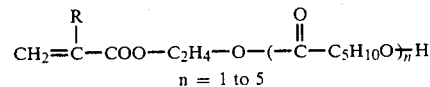

n = 1 to 5 and the like.

In the above formulas, R is a hydrogen or methyl group.

If the amount of hydroxy bearing ethylenically unsaturated monomer is less than the abovesaid lower limit of 10 weight %, this results in a coating of insufficient strength and if it is over the upper limit of 40 weight %, this results in a resin composition having an increased viscosity and which is excessively crosslinked.

The monomers may further include ethylenic unsaturated acid in an amount of 0 to 10 weight % of the total weight of monomers and a chain transfer agent, but too excessive an amount of the ethylenic unsaturated acid is not recommended because of an undesirable lowering of the water resistance of the formed film.

Examples of the aforementioned ethylenic unsaturated acids are acrylic acid and methacrylic acid. The monomers may additionally include other copolymerizable monomers in an amount of 0 to 30 weight % of the total weight of monomers and a chain transfer agent. Examples of such monomers are styrene and styrene derivatives (e.g. t-butyl styrene, α-methyl styrene, vinyl toluene); nitrogen containing monomers, such as dimethyl aminoethyl acrylate, dimethyl aminoethyl methacrylate, diethyl aminoethyl acrylate, diethyl aminoethyl methacrylate, vinyl pyridine, acrylamide, N-methylol acrylamide, N-butoxyl methyl acrylamide, acrylonitrile; fumaric ester, itaconic ester, maleic ester and the like. As the most characteristic feature of the present invention, the abovesaid monomers are used in combination with 2,4-diphenyl-4-methyl-1-pentene as a chain transfer agent.

In the present invention, 2,4-diphenyl-4-methyl-1-pentene is specifically selected not only as an active chain transfer agent, but also as a resin constituting unit to improve the film properties as gloss, sharpness, water resistance and the like.

In contrast to the known findings in connection with the polymerization of vinyl monomers, in the present acrylic monomer polymerization system, the 2,4-diphenyl-4-methyl-1-pentene chain transfer agent has to be used in a larger quantity, i.e. in a range of 2 to 60 weight % of the total of the monomers and the chain transfer agent. More preferably, the chain transfer agent should be used in an amount corresponding to 5 to 40 weight % of the total of the monomers and the chain transfer agent.

If the said amount of chain transfer agent is less than 2 weight %, one cannot obtain an acrylic resin having a number average molecular weight of 500 to 5000 and the thus obtained resin cannot be used for the preparation of a high solids paint. Similarly, if the chain transfer agent is less than 2 weight %, the properties of the formed coating are not of satisfactory in respect to gloss, sharpness, water resistance and the like. On the other hand, if the said amount of chain transfer agent is over the upper limit of 60 weight %, this results in a coating with inferior film properties.

The present acrylic resin composition for high solids paint use is obtained by subjecting a mixture of the above said monomers and the chain transfer agent, each in specified amounts, to a polymerization in the presence or absence of solvent and with one or more radical polymerization initiators. When used, the solvent may be selected from any of the known solvents customarily used in the preparation of an acrylic polymer, including xylene, n-butanol, isobutanol, Solvesso (trade mark), butyl acetate, isopropanol, dioxane and the like.

The radical polymerization initiator is also of common type and examples of suitable initiators are benzoyl peroxide, lauroyl peroxide, t-butyl hydroperoxide, acetyl cyclohexane sulfonyl peroxide, diisobutyl peroxide, t-butyl peroxy benzoate, diisopropyl peroxy dicarbonate, azo-bis-(2-methyl propionitrile), t-butyl peroxy-2-ethyl hexanoate, azo-bis-isobutyronitrile and the like.

The polymerization may be effected in a conventional way to obtain an acrylic resin having a number average molecular weight of 500 to 5000, preferably 800 to 4000 and more preferably 1000 to 2500.

If the number average molecular weight of the acrylic resin is less than 500, this results in a coating with inferior properties, whereas if it is over the upper limit of 5000, one is unable to formulate a high solids paint.

The acrylic resin of the present inventions is therefor quite useful as a resinous vehicle for a high solids coating composition capable of producing a coating with excellent film properties in respect to, inter alia, water resistance, weather resistance, coatings which have an anti-cracking appearance and the like. The present resinous composition is especially useful for the preparation of a curing type high solids paint by combining it with a hardner such as a melamine-formaldehyde resin, a urea-formaldehyde resin, a polyisocyanate and the like.

When a melamine-formaldehyde resin is selected, the weight ratio of the acrylic resin of the present invention to the melamine-formaldehyde resin is preferably determined in a range of 70/30 to 30/70. This is because if the amount of melamine-formaldehyde resin is less than the lower limit of 70/30, the cured coating is deficient in strength and if it is over the upper limit of 30/70, this results in an excessively hard and brittle coating.

As to the molecular weight of such melamine-formaldehyde resin (in the case when two and more melamine formaldehyde resins are used as, an average value), it is preferably determined to have a molecular weight limit of less than 1000. This is because, if it is more than 1000, a high solids paint with the desired properties can be hardly obtained with the present acrylic resin.

In the case when a polyisocyanate is selected as a hardner, it should be used in an amount capable of resulting in an equivalent ratio of NCO of the polyisocyanate the OH of the acrylic resin of 0.5 to 2.0, preferably 0.8 to 1.2. This is because, if the ratio of NCO/OH is less than 0.5, the cured coating is deficient in strength and if it is more than 2.0, no additional effect can be expected therefrom.

By the adoption of the above conditions, a highly desired high solids paint can be prepared, which is excellent in water resistance, weather resistance, appearance and the like. In preparing such paint, it is of course possible to add other additives such as a viscosity modifier (e.g. organic montmorillonite, cellulose acetate butyrate), a surface conditioner (e.g. silicone, organic high polymer), a UV absorber, a hindered amine, a hindered phenol, coloring matter and the like.

In the case of preparing a base coat composition for a 2-coat-1-bake metallic paint, metallic pigments such as aluminium flakes, copper bronze flakes and the like may be used with other optional coloring matter.

The inventor has also found that crosslinked polymer microparticles may be advantageously added to the high solids paint to further improve the sagging properties of the coating composition and the appearance of the 2-coat-1-bake type metallic paint.

The invention shall be now more fully explained in the following Examples. Unless otherwise being stated, all parts and percentage are by weight.

EXAMPLE 1

Into a reaction vessel fitted with a stirrer, a thermometer, a reflux condenser, a nitrogen gas inlet tube and a dropping funnel, were placed 350 parts of xylene and 40 parts of n-butanol, and after heating, under nitrogen gas stream to 130° C., the following mixture (a) was dropwise added from the dropping funnel at a constant speed in 3 hours.

Mixture (a)

Styrene: 200 parts
2-ethylhexyl methacrylate: 452
2-ethylhexyl acrylate: 55
2-hydroxyethyl methacrylate: 162
methacrylic acid: 31
2,4-diphenyl-4-methyl-1-pentene: 100
t-butyl peroxy-2-ethylhexanoate: 30

After completion of said addition, the mixture was maintained at the same temperature for 30 minutes, and then added dropwise with a solution of 10 parts of t-butyl peroxy-2-ethyl hexanoate in 20 parts of xylene in 1 hour. Thereafter, the combined mixture was maintained at 130° C. for 5 hours and then allowed to cool to obtain a resinous solution (A). The characteristics of the thus obtained resin and resinous solution are shown in Table 1.

EXAMPLE 2

The same procedures as stated in Example 1 were repeated except the following mixture (b) was substituted for the mixture (a) to obtain a resinous solution (B).

Mixture (b)
Styrene: 200 parts
methyl methacrylate: 370
2-ethylhexyl acrylate: 145
2-hydroxyethyl acrylate: 165
2,4-diphenyl-4-methyl-1-pentene: 100
acrylic acid: 20
azo-bis-isobutyronitrile: 30

The characteristics of the thus obtained resin and resinous solution are shown in Table 1.

EXAMPLE 3

Into a similar reaction vessel as used in Example 1, were placed 220 parts of Solvesso 100 (manufactured by Esso Standard Petroleum Co.) and after heating, under nitrogen gas stream to 150° C., the following mixture (c) was added dropwise from the dropping funnel, at a constant speed in 3 hours.

Mixture (c)
ethyl acrylate: 307 parts
ethyl methacrylate: 292
2-hydroxyethyl methacrylate: 116
Prac-cell FM-1[(1)]: 217
methacrylic acid: 18
2,4-diphenyl-4-methyl-1-pentene: 50
azo-bis-isobutyronitrile: 30
t-butyl peroxy-2-ethyl hexanoate: 60

[(1)]Trade mark of Daicel K.K. 2-hydroxyethyl methacrylate/ε-caprolactone=1/1 adduct After completion of said addition, the mixture was maintained at the same temperature for 30 minutes, and added dropwise with a solution of 10 parts of t-butyl peroxy-2-ethylhexanoate in 30 parts of Solvesso 100, at a constant speed, in 30 minutes. Thereafter, the combined mixture was maintained at 150° C. for 3 hours and then allowed to cool to obtain a resinous solution (C). The characteristics of the thus obtained resin and resinous solution are shown in Table 1.

EXAMPLE 4

The same procedures as stated in Example 3 were repeated with the following mixture (d) used in place of the mixture (c), to obtain a resinous solution (D).

Mixture (d)
Styrene: 100 parts
n-butyl methacrylate: 191
lauryl methacrylate: 246
2-hydroxyethyl methacrylate: 232
methacrylic acid: 31
2,4-diphenyl-4-methyl-1-pentene: 200
t-butyl peroxy-2-ethylhexanoate: 30

The characteristics of the thus obtained resin and resinous solution are shown in Table 1.

COMPARATIVE EXAMPLE 1

The same procedures as stated in Example 1 were repeated with the following mixture (e) in place of the mixture (a), to obtain a resinous solution (E).

Mixture (e)
Styrene: 290 parts
2-ethylhexyl methacrylate: 452
2-ethylhexyl acrylate: 55
2-hydroxyethyl methacrylate: 162
methacrylic acid: 31
2,4-diphenyl-4-methyl-1-pentene: 10
t-butyl peroxy-2-ethylhexanoate: 30

The characteristics of the thus obtained resin and resinous solution are shown in Table 1.

COMPARATIVE EXAMPLE 2

The same procedures as stated in Example 1 were repeated with the following mixture (f) in place of the mixture (a), to obtain a resinous solution (F).

Mixture (f)
Styrene: 300 parts
2-ethylhexyl methacrylate: 452
2-ethylhexyl acrylate: 55
2-hydroxyethyl methacrylate: 162
methacrylic acid: 31
lauryl mercaptan: 40
t-butyl peroxy-2-ethylhexanoate: 30

The characteristics of the thus obtained resin and resinous solution are shown in Table 1.

COMPARATIVE EXAMPLE 3

The same procedures as stated in Example 1 were repeated with the following mixture (h) in place of the mixture (a), to obtain a resinous solution (H).

Mixture (h)
n-butyl methacrylate: 307 parts
2-ethylhexyl methacrylate: 500
2-hydroxyethyl methacrylate: 162
methacrylic acid: 31
lauryl mercaptan: 40
t-butyl peroxy-2-ethylhexanoate: 30

The characteristics of the thus obtained resin and resinous solution are shown in Table 1.

EXAMPLE 5

Into a similar reaction vessel as used in Example 1, were placed 300 parts of Solvesso 100 and 112 parts of methyl isobutyl ketone, and the mixture was, under nitrogen gas stream, heated to 125° C. and then added dropwise with the following mixture (g) from the dropping funnel in 3 hours.

Mixture (g)
Styrene: 200 parts
2-ethylhexyl methacrylate: 400
2-ethylhexyl acrylate: 60
2-hydroxyethyl methacrylate: 210
2,4-diphenyl-4-methyl-1-pentene: 100
t-butyl peroxy-2-ethylhexanoate: 30

After completion of said addition, the mixture was maintained at the same temperature for 30 minutes, and added dropwise with a solution of 10 parts of t-butyl peroxy-2-ethylhexanoate in 20 parts of Solvesso 100 in 1 hour. Thereafter, the combined mixture was maintained at 125° C. for 5 hours, added with 52 parts of tetrachlorophthalic anhydride and reacted for additional 1 hour to obtain a resinous solution (G). The characteristics of the thus obtained resin and resinous solution are shown in Table 1.

EXAMPLE 6

To 714 parts of the resinous solution (A) obtained in Example 1, were added 500 parts of Cymel 303 (methoxy methylol melamine manufctured by Mitsuitohatsu, Trade mark, number average molecular weight 400), 10 parts of triethylamine salt of p-toluene sulfonic acid, 10 parts of Tinuvin 900 (trade mark of Ciba-Geigy, UV absorber), 10 parts of Sanol LS-292 (trade mark of Ciba-Geigy, hindered amine), and (part of Modaflow (trade mark of Mitsubishi Monsanto, surface conditioner) and the combined mixture was further diluted with Solvesso 100 to a #4 Ford cup viscosity of 30 seconds. The thus obtained clear coating solution (CL-1) had a non-volatile content of 56%.

EXAMPLE 7

Using 514 parts of the resinous solution (B) obtained in Example 2, 240 parts of Cymel 303, 400 parts of rutile type titanium dioxide and 10 parts of Modaflow, a white colored enamel coating composition was prepared in a conventional way, and then diluted with a mixed solvent (butyl acetate/xylene/Solvesso 100=2/2/1) to a #4 Ford cup viscosity of 23 seconds to obtain a white colored enamel coating composition [W-1].

The solid content of the thus obtained composition was 61%. The crosslinked polymer particles used in the following examples were prepared as follows:

Preparation of Emulsifier

To a two liter flask having a stirring means, a reflux condenser, temperature-control means, a nitrogen gas-introducing tube and a decanter were added 134 parts of N,N-bis(hydroxyethyl)taurine, 130 parts of neopentyl glycol, 236 parts of azelaic acid, 186 parts of phthalic anhydride, and 27 parts of xylene. The mixture was refluxed and water was removed as an azoetropic mixture with xylene. The temperature was raised to 190° C. over 2 hours and the reaction was continued with stirring until an acid number of 145 was reached.

The reaction product was cooled to 140° C. and 314 parts of CARDURA E-10 (glycidyl versatate, Shell Chemical Company) was added dropwise over 30 minutes at 140° C.

The reaction was continued for an additional two hours with stirring. A polyester resin having an acid number of 59, a hydroxyl number of 90 and a number average molecular weight (Mn) of 1054 was obtained.

Synthesis of crosslinked polymer particle I

To a one liter flask provided with stirring means, cooling means and temperature-control means were added 282 parts of deionized water, 20 parts of the above-described emulsifier and 0.75 parts of diethanolamine at 80° C. The mixture was stirred to make a solution. To the solution were added a solution of 4.5 parts of azobiscyanovaleric acid and 4.3 parts of dimethylethanolamine in 45 parts of deionized water. Then a monomer mixture consisting of 105.0 parts of methy methacrylate, 20.6 parts of 2-hydroxyethyl acrylate and 82.5 parts of ethylene glycol dimethacrylate was added dropwise over 60 minutes. After the addition of monomers, a solution of 1.5 parts of azobiscyanovaleric acid and 1.4 parts of dimethylethanolamine in 15 parts of deionized water was added. The mixture was stirred at 80° C. for 60 minutes to give a polymeric emulsion having a nonvolatile content of 40, a pH of 7.7, a viscosity of 51 cps (25° C.) and a particle size of 0.05 microns.

This emulsion was spray dried to obtain crosslinked polymer particle I.

Synthesis of crosslinked polymer particle II

To a one liter flask provided with stirring means, cooling means and temperature-control means were added 282 parts of deionized water, 20 parts of the above-described emulsifier and 0.75 parts of diethanolamine at 80° C. The mixture was stirred to make a solution. To the solution were added a solution of 4.5 parts of azobiscyanovaleric acid and 4.3 parts of dimethylethanolamine in 45 parts of deionized water. Then a monomer mixture consisting of 20.7 parts of methyl methacrylate, 31.1 parts of n-butyl acrylate, 62.2 parts of styrene, 0.4 parts of 2-hydroxyethyl acrylate and 82.9 parts of ethylene glycol dimethacrylate was added dropwise over 60 minutes. After the addition of monomers, a solution of 1.5 parts of azobiscyanovaleric acid and 1.4 parts of dimethylethanolamine in 15 parts of deionized water was added. The mixture was stirred at 80° C. for 60 minutes to give a polymeric emulsion having a nonvolatile content of 40, a pH of 7.8, a viscosity of 36 cps (25° C.) and a particle size of 0.06 microns.

This emulsion was spray dried to obtain crosslinked polymer particle II.

EXAMPLE 8

Using 531 parts of the resinous solution (C) obtained in Example 3, 425 parts of Cymel 303, 150 parts of crosslinked polymer particles (I), 10 parts of p-toluene sulfonic acid, 240 parts of Alpaste 7160N (trade mark of Toyo Aluminum), 10 parts of Seesorb 103 (trade mark of Shiraishi Calcium K.K., UV absorber), and 5 parts of Sanol LS-770 (trade mark of Ciba-Geigy, hindered amine), a metallic coating composition was prepared in a conventional way, and then diluted with a mixed solvent (toluene/n-butanol/ethoxyethyl acetate=3/1/1) to a #4 Ford cup viscosity of 15 seconds to obtain a metallic coating composition [M-1]. The solid content of the thus obtained composition was 52%.

EXAMPLE 9

Using 625 parts of the resinous solution (D) obtained in Example 4, 500 parts of Cymel 303, 20 parts of triethylamine salt of p-toluene sulfonic acid, 10 parts of Tinubin 900, 10 parts of Sanol LS-292, and 1 part of Modaflow, a clear coating composition was prepared and then diluted with Solvesso 100 to a #4 Fordcup viscosity of 30 seconds to obtain a clear coating composition (CL-2), whose non-volatile content was 62%.

EXAMPLE 10

Using 625 parts of the resinous solution (D) obtained in Example 4, 250 parts of Cymel 303, 250 parts of Uvan 120 (butoxy methylol melamine manufactured by Mitsuitohatsu, number average molecular weight of 1030), 30 parts of crosslinked polymer particles (II), 20 parts of triethylamine salt of p-toluene sulfonic acid, 20 parts of Tinuvin 900, 10 parts of Sanol LS-292 and 1 part of Modaflow, a clear coating composition was prepared and then diluted with Solvesso 100 to a #4 Ford cup viscosity of 30 seconds, to obtain a clear coating composition (CL-3) whose non-volatile content was 61%.

EXAMPLE 11

Using 625 parts of the resinous solution (G) obtained in Example 5, 500 parts of Cymel 303, 10 parts of Tinuvin 900, 10 parts of Sanol LS-b 292 and 1 part of Modaflow, a clear coating composition was prepared and then diluted with Solvesso 100 to a #4 Ford cup viscosity of 30 seconds to obtain a clear coating composition (CL-4), whose non-volatile content was 60%.

COMPARATIVE EXAMPLE 4

Following the procedures of Example 6 but substituting the resinous solution (E) obtained in Comparative Example 1 for the resinous solution (A), a clear coating composition (CL-5) was obtained, whose non-volatile content was 39%.

COMPARATIVE EXAMPLE 5

Following the procedures of Example 6 but substituting the resinous solution (F) obtained in Comparative Example 2 for the resinous solution (A), a clear coating composition (CL-6) was obtained, whose non-volatile content was 57%.

COMPARATIVE EXAMPLE 6

Following the procedures of Example 6 but substituting the resinous solution (H) obtained in Comparative Example 3 for the resinous solution (A), a clear coating composition (CL-7) was obtained, whose non-volatile content was 57%.

EXAMPLE 12

A soft steel plate previously degreased and subjected to a phosphating treatment was applied with an automobile primer electro-deposit and a surfacer inter coat.

Onto the thus prepared plate, the metallic coating composition (M-1) obtained in Example 8 was applied by a spray coating and the plate was, after standing at a room temperature for 3 minutes, coated with the clear coating composition obtained in Example 6 by a spraying means. Thereafter, the coating plate was kept standing at a room temperature for 10 minutes and then baked at 140° C. for 30 minutes. Thus, a 2-coat-1-bake metallic coating (I) was prepared. An accelerated weathering test was carried out and the test result was shown in Table II.

An accelerated weathering test: One cycle of test consists of the treatment in a Sunshine weather-O-meter (manufactured by Suga Shikenki K.K.) (illumination 600 hours) and the subsequent treatment in a wetting apparatus (50° C., 98% relative humidity, 96 hours). A test piece is subjected to 3 cycles of tests and then evaluated with respect to gloss and appearance thereof.

EXAMPLES 13 TO 15 AND COMPARATIVE EXAMPLES 7 TO 9

2-coat-1-bake metallic coatings (II) to (VI) were prepared according to the procedures of Example 12 but replacing the clear coating composition (CL-1) with each of the clear coating compositions (CL-2), (CL-3), (CL-4), (CL-5), (CL-6) and (CL-7). Accelerated weathering tests were carried out and the test results were shown in Table II.

EXAMPLE 16

A soft steel plate previously degreased and subjected to a phosphating treatment was applied with an automobile primer electrodeposit and a surface intercoat. Onto the thus prepared plate, the white colored enamel coating composition obtained in Example 7 was sprayed and the plate was, after standing at a room temperature for 10 minutes, baked at 140° C. for 30 minutes to obtain a white colored coating film (VII). An accelerated weathering test was carried out with the coating and the test results were shown in Table II.

TABLE 1

| | resinous solution | number average molecular weight | non-volatile content % | viscosity |
|---|---|---|---|---|
| Example | | | | |
| 1 | A | 2800 | 70 | $Z_1$ |
| 2 | B | 2300 | 70 | Y |
| 3 | C | 1800 | 80 | $Z_4$ |
| 4 | D | 1900 | 80 | $Z_5$ |
| 5 | G | 2800 | 70 | $Z_3$ |
| Comp. Ex. | | | | |
| 1 | E | 6300 | 70 | more than $Z_6$ |
| 2 | F | 2700 | 70 | Z |
| 3 | H | 2700 | 70 | Z |

TABLE II

| | | initial gloss (60°) | after accelerated weathering test | |
|---|---|---|---|---|
| | | | gloss (60°) | appearance |
| Example | | | | |
| 12 | metallic coating (I) | 98 | 80 | no abnormality |
| 13 | metallic coating (II) | 97 | 79 | no abnormality |
| 14 | metallic coating (III) | 97 | 78 | no abnormality |
| 15 | metallic coating (IV) | 98 | 79 | no abnormality |
| 16 | white colored coating (VII) | 96 | 76 | no abnormality |
| Comp. Ex. | | | | |
| 6 | metallic coating (V) | 98 | 80 | no abnormality |
| 7 | metallic coating (VI) | 97 | 21 | white blooming, cracking |
| 8 | metallic coating (VII) | 82 | 15 | white blooming, cracking |

In these Examples and Comparative Examples, the applied layers were as follows:
base coating: 20μ
clear coating: 30 to 40μ
solid coating: 40 to 45μ
each on dry basis.

What is claimed is:

1. An acrylic resin composition for use in high solids paints, which consists essentially of an acrylic copolymer having a number average molecular weight of 500 to 5000, prepared by subjecting the following mixture to polymerization:
   (A) 30 to 88 weight % of an alkyl (meth)acrylate,
   (B) 2 to 60 weight % of 2,4-diphenyl-4-methyl-1-pentene,
   (C) 10 to 40 weight % of a hydroxy bearing ethylenically unsaturated monomer selected from the group consisting of hydroxyethyl acrylate, hydroxyethyl methacrylate, hydroxypropyl acrylate, hydroxypropyl methacrylate, diethylene glycol acrylate, diethylene glycol methacrylate, hydroxybutyl methacrylate, and a member represented by either one of the following formulae:

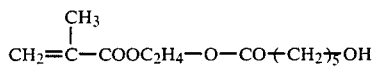
$$CH_2=\underset{\underset{CH_3}{|}}{C}-COOC_2H_4-O-CO(CH_2)_5OH \qquad \text{I.}$$

$$CH_2=\underset{\underset{R}{|}}{C}-COO(C_2H_4O)_{\overline{n}}H \qquad \text{II.}$$

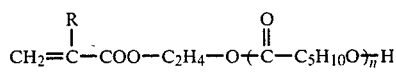
$$CH_2=\underset{\underset{R}{|}}{C}-COO-C_2H_4-O(\underset{\underset{O}{\|}}{C}-C_5H_{10}O)_{\overline{n}}H \qquad \text{III.}$$

wherein n in formula II is 2 or more and n in formula III is 1 to 5, and wherein said R group represents hydrogen or a methyl group, (D) 0 to 10 weight % of an ethylenic unsaturated acid selected from the group consisting of acrylic acid and methacrylic acid, and (E) 0 to 30 weight % of another copolymerizable monomer selected from the group consisting of t-butyl styrene, α-methyl styrene, vinyl toluene, dimethyl aminoethyl acrylate, dimethyl aminoethyl methacrylate, diethyl aminoethyl acrylate, diethyl aminoethyl methacrylate, vinyl pyridine, acrylamide, N-methylol acrylamide, N-butoxyl methyl acrylamide, acrylonitrile; fumaric ester, itaconic ester, maleic ester, said polymerization being carried out in the presence of one or more radical initiators.

2. The composition according to claim 1, wherein the weight % of 2,4-phenyl-4-methyl-1-pentene is 5 to 40 weight %.

* * * * *